US012074878B2

(12) United States Patent
Ball et al.

(10) Patent No.: US 12,074,878 B2
(45) Date of Patent: Aug. 27, 2024

(54) ACCOUNT PROVISIONING MANAGER

(71) Applicant: Microsoft Technology Licensing, LLC, Redmond, WA (US)

(72) Inventors: Steve Ball, Redmond, WA (US); Justin Anthony Niles, Woodinville, WA (US); Muhammad Omer Iqbal, Redmond, WA (US); Sadie Elise Henry, Windsor, CO (US); Sangeeta Ranjit, Bellevue, WA (US); Sarat Chandra Subramaniam, Bellevue, WA (US); Michael Vincent McLaughlin, Seattle, WA (US); Rachel Anne Brown Teller, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 17/364,745

(22) Filed: Jun. 30, 2021

(65) Prior Publication Data
US 2023/0007004 A1 Jan. 5, 2023

(51) Int. Cl.
*G06Q 20/20* (2012.01)
*H04L 9/40* (2022.01)
*H04L 67/306* (2022.01)

(52) U.S. Cl.
CPC ........... *H04L 63/102* (2013.01); *G06Q 20/20* (2013.01); *G06Q 20/206* (2013.01); *H04L 63/101* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 6,772,131 | B1* | 8/2004 | Francis | G06Q 10/10 705/42 |
| 8,873,086 | B2* | 10/2014 | Jones | G06Q 30/04 705/317 |
| 9,529,804 | B1* | 12/2016 | Muddu | G06F 16/9027 |
| 2002/0029269 | A1* | 3/2002 | McCarty | H04L 63/0815 709/225 |
| 2014/0279610 | A1* | 9/2014 | Hendrix | G06Q 30/018 705/317 |
| 2016/0277439 | A1* | 9/2016 | Rotter | H04L 63/0861 |
| 2017/0052652 | A1* | 2/2017 | Denton | G06Q 50/01 |
| 2017/0178193 | A1* | 6/2017 | Jagannath | G06Q 30/04 |
| 2019/0286813 | A1* | 9/2019 | Lounsberry | H04L 9/0894 |
| 2019/0288995 | A1* | 9/2019 | Bose | H04L 63/20 |
| 2021/0049680 | A1* | 2/2021 | Solis | G06Q 20/023 |
| 2021/0097120 | A1* | 4/2021 | Gutierrez | G06F 16/137 |
| 2021/0149899 | A1* | 5/2021 | Gutiérrez | G06F 9/451 |
| 2021/0226957 | A1* | 7/2021 | Rayner | H04L 63/102 |

* cited by examiner

*Primary Examiner* — Fateh M Obaid
(74) *Attorney, Agent, or Firm* — Wade IP Law PLLC

(57) ABSTRACT

An account provisioning manager is disclosed. A placeholder account is generated with a primary work set attribute and a plurality of enhanced work set attributes. Initially, the primary work set attribute is populated with data to convert the placeholder account into an onboarded operating account. Subsequently, the plurality of enhanced work set attributes are populated via data propagation into the onboarded operating account, wherein an enhanced work set attribute of the plurality of enhanced work set attributes is selectively populated in response to a trigger for the onboarded operating account.

20 Claims, 3 Drawing Sheets

ACCOUNT PROVISIONING MANAGER

BACKGROUND

Identity providers include systems that create, maintain, and manage identity information for principals, such as security principals or entities that can be authenticated by a computer system, and can provide authentication services, in some examples, to relying applications in a federation or distributed network. Provisioning into the identity system includes the process of creating an object based on selected conditions. For example, when a new user joins an organization, the user can be entered into a human resources system. Provisioning can create a corresponding user account in an identity management system, a human capital system, and different applications, such as cloud applications, that the user will access to perform functions of the organization.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

The disclosure is directed to an account provisioning manager and the use of placeholder accounts to onboard an account into an organization, such as into an identity service. The typical onboarding processes can involve a set of manual and programmatic steps that are cumbersome for teachers, managers, information technology (IT) personnel, and human resources departments, including circumstances in which onboarding personnel is performed by non-IT trained individuals, that are dependent upon accomplishing a number of multiple, disconnected tasks. Accordingly, new users often attempt to access resources as part of their organizational functions prior to the resources becoming available via typical onboarding procedures. The disclosure involves creating a set of placeholder accounts that are ready to be populated with specific attributes once the account is ready to be onboarded, such as when a new user joins an organization, such as a new employee or guest joins an enterprise. The attributes include primary work set attributes and enhanced work set attributes. In one example, the primary work set attributes and enhanced work set attributes can be defined by the organization.

Primary work set attributes are attributes that enable an appropriate number of services to permit an employee or guest to jumpstart employment, such as with sufficient security settings to prevent breaches, inappropriate access or risk to resources/assets for someone who is new in role, to provide quick onboarding in minutes rather than days. The primary work set attributes of the placeholder account are initially populated with data to convert the placeholder account into an onboarded and operating account.

Enhanced work set attributes are those beyond the primary work set attributes but are used, for example, to provide complete provisioned employment status. Propagation of the enhanced work set attributes, in one example, can continue via the normal processes after the account has been onboarded. After the primary work set attributes are populated, the plurality of work set attributes are populated via data propagation into the onboarded operating account. In one example, the enhanced work set attributes can be populated with a just-in-time process such as in response to a trigger. For instance, if an employee checks a payroll status of the account, the check on payroll status provides a trigger to populate attributes related to payroll status, while propagation of other attributes is temporarily paused or otherwise allowed to proceed in the normal processes. Another example may include point-of-sale, such as cash register access, which may be gated for new retail employees until enhanced work set attributes have been provided.

The account provisioning manager can be implemented as a method, a computer readable storage device to store computer executable instructions to control a processor, and a system including a memory to store a set of instructions and a processor to execute the instructions. For example, the account provisioning manager can receive a placeholder account with a primary work set attribute and a plurality of enhanced work set attributes. Initially, the primary work set attribute is populated with data to convert the placeholder account into an onboarded operating account. Subsequently, the plurality of enhanced work set attributes are populated via data propagation into the onboarded operating account, wherein an enhanced work set attribute of the plurality of enhanced work set attributes is selectively populated in response to a trigger applied to the onboarded operating account.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
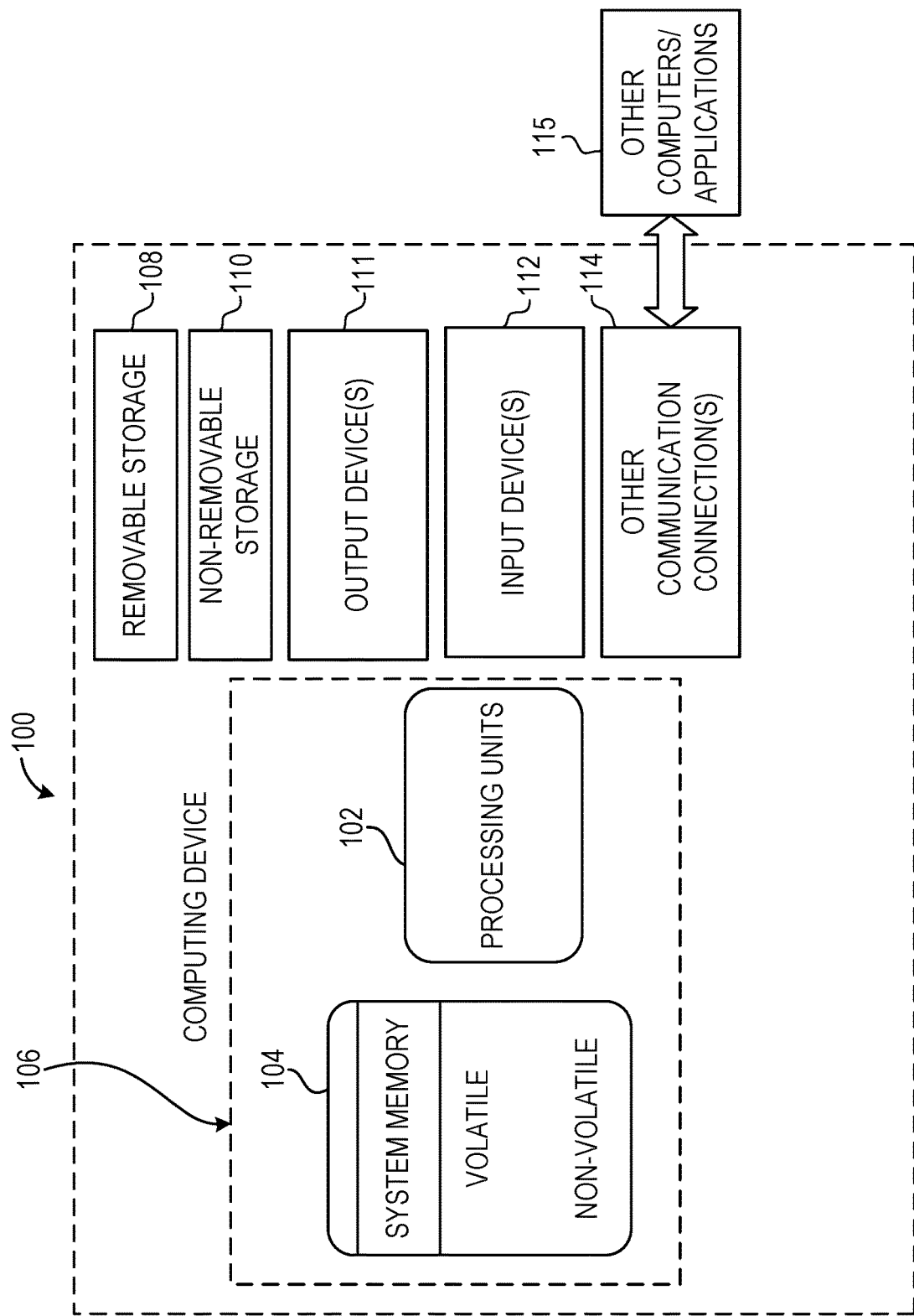
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

A hybrid cloud is a deployment model that includes two or more clouds, such as private clouds, public clouds, and community clouds or combinations of two or more of each deployment model, that remain unique entities. Hybrid clouds include technology to bind together the two or more clouds, and in some examples permit data and application portability across clouds, such as cloud bursting for load balancing, and service interoperability.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
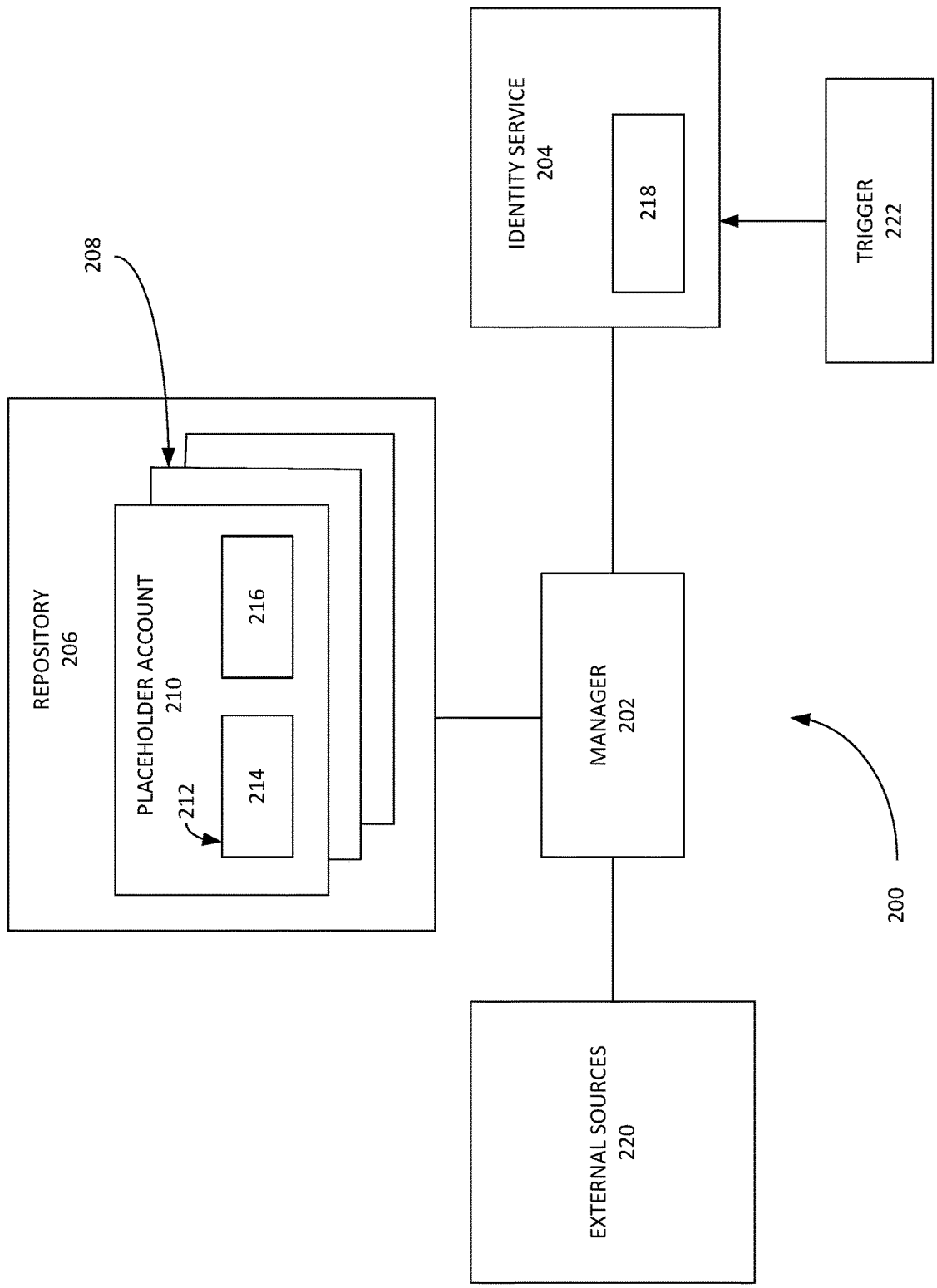
FIG. 2 is a schematic diagram illustrating an example environment of an account provisioning manager and an identity service for use with a computing device of FIG. 1.

FIG. 2 illustrates an example computing environment 200 implemented as a system of an account provisioning manager 202. The account provisioning manager 202 can include a computer readable storage device to store computer executable instructions to control a processor, such as a server in a datacenter. In one example, account provisioning manager 202 can be implemented as part of an infrastructure or platform as a service such as for a cloud tenant. In another example, account provisioning manager 202 can be implemented as a software as a service such as for subscribers in other clouds, hybrid clouds, or private networks. In one example, the account provisioning manager 202 can be implemented as a computer program to run a processor.

The account provisioning manager 202 in the example is operably coupled to and configured to work with an identity service 204 that makes use of a set of accounts, which can include device accounts and user accounts. An account can corresponds with a user in the organization associated with the identity service 204, such as an employee or guest of an enterprise. The account includes information applicable to the user such as user data and can include roles and permissions for resources to which the user has access. For example, a user account can relate to various services, such as resources, including a human capital or financial management cloud application, a human resources on premises application, on premises computer programs, cloud applications or web applications. The example environment is described with reference to human capital or human resources services for illustration, but the account provisioning manager can be applicable to other accounts in other identity services.

In one example, the computer environment 200 can include a cloud-computing environment, such as a public cloud, to deploy applications and data on a platform and infrastructure across selected datacenters. In the illustrated example, the cloud-computing environment can provided capability to a cloud tenant, such as one or more cloud tenants, to deploy applications and data as cloud-based assets to the cloud computing environment and address infrastructure issues. The cloud computing environment includes, or includes access to, resources available from one or more resource providers. A resource can include a component of the application to be provisioned in a platform subscription and provides an item of the platform solution. Examples of resources can include virtual machines, databases, virtual networks, and others. Resources can be user-managed entities, entities automatically managed by a platform with the cloud environment, or a combination of user-managed and automatically managed entities. Resource providers include services that provide resources for the cloud-based assets. Resource providers include services to create, configure, and manage operations for working with the resource. Examples of resource providers include a compute provider to supply a virtual machine resource, storage provider to supply a storage account resource, web provider to supply resources related to web applications, and other resource providers.

Cloud tenants typically can communicate with other devices, including each other or with other users of devices located outside the cloud environment via a network, such as the internet. In one example the cloud tenants can communicate with other devices via assigned network addresses, such as an assigned internet protocol (IP) addresses. In one example, a user of a device can log in to a cloud tenant via a user account, and access resource such as cloud-based assets from the cloud environment. In some examples, the resources are available to authorized users, and the user account may have further restrictions via permissions from a set of permission levels to each authorized user account for each resource in the computer network.

A cloud tenant may permit user access to the assets and resources via one or more user accounts in a user session. In one example, a user can access a cloud tenant of the cloud tenants with a computing device through the identity service 204. For instance, the user may enter a username and password associated with the account to an authentication server or similar service for authentication and demonstration that the user is an authorized user with the credentials for privileges to access the cloud tenant. Once authenticated, the user can perform operations on the tenant in a user session, or simply session, until the user logs off the cloud tenant. The operations can include a sequence of commands. In some examples, these operations may be recorded in logs attributed to the user account or other credentials. The user of device may be identified by access credentials that are stored on a storage device associated with an identity access management service. The access credentials may include the user identifier, such as a user name, passwords, permissions, and information related to the user's relationship with the enterprise, such as the cloud tenant. The user access credentials may be included with the user account.

The account provisioning manager 202 is operably coupled to a placeholder account repository 206, which includes a plurality of placeholder accounts 208. A placeholder account 210 of the plurality of placeholder accounts 208 includes attributes 212. The attributes 212 can be ranked via priority into an order that the account provisioning manager 202 will populate the data into the attributes 212. For example, the attributes 212 can be ranked into a primary work set attribute 214, such as a plurality of primary work set attributes, and a plurality of primary work set attributes, and a plurality of enhanced work set attributes 216. In one example, the enhanced work set attributes 216 can be further ranked in order of priority or population or the order of population can be programmatically altered during population of the enhanced work set attributes 216.

The plurality of placeholder accounts 208 can include a set of placeholder accounts for different classes of users, such as different classes of employees. Classes can be distinguished by a number of categorizations including job function, job roles, departments within the enterprise, whether the employee is a temporary employee, permanent employee, or contractor. A set of placeholder accounts of the plurality of place holder accounts 208 can include a set of primary work set attribute 214 and enhanced work set attributes 216 appropriate for the class of user, or employee. In one example, the placeholder accounts can be programmatically altered at the enterprise to allow the organization to particularly define the classes as well as what attributes 212 are designated as primary work set attributes 214 or enhanced work set attributes 216. The plurality of placeholder accounts 208 are templatized user accounts, which may be associated with or appropriate for industry specific jobs/roles in which resource access is tied to each category, that are ready to be populated with particular or specific data into the attributes 212 as the data becomes available during the typical multi-step onboarding process so that the overall perceived latency in completely onboarding a user account is masked.

Primary work set attributes 214 are attributes 212 that enable an appropriate number of services to allow the user to perform a base functionality in the organization associated with their class, or the appropriate number of services to permit an employee or guest to begin employment, such as minimal access. Primary work set attributes 214, in one example, are the highest ranked attributes 212 in order of population priority. Population of the primary work set attributes 214 provide quick onboarding in minutes rather than days. The primary work set attributes 214 of the placeholder account 210 are initially populated with data to convert the placeholder account 210 into an onboarded and operating account 218. In an example of initially populated, some primary work set attributes 214 are pre-populated in the placeholder account repository 206. In another example, account provisioning manager 202 receives the placeholder account 210 from the repository, and populates the primary work set attribute 214. The account provisioning manager 202 completes the population of the primary work set attributes 214 in the placeholder account 210, which transforms the placeholder account 210 into the onboarded and operating account 218 for use with the identity service 204.

Enhanced work set attributes 216 are those beyond the primary work set attributes 214 but are used, for example, to provide complete provisioned employment status. Propagation of the enhanced work set attributes 216, in one example, can continue via the normal processes after the account has been onboarded and is an onboarded and operating account 218 with the identity service 204. After the primary work set attributes 214 are populated, the plurality of enhanced work set attributes 216 are populated via data propagation into the onboarded operating account 218. Data for the primary work set attributes 214 can be accessed from other systems 220, which may be signals external from the enterprise. For example, other systems 220 can include social security, clearance services, tax data repositories, credit bureaus, and decentralized data sources. Data for enhanced work set attributes 216 can be stored on memory devices such as data storage mechanisms on systems 220 that are operably coupled to the account provisioning manager 202. The account provisioning manager 202 can query the other systems 220 for the data related to the enhanced work set attributes 216, and the other systems 220 can access data storage systems and provide to the account provisioning manager 202 an appropriate format of the information for populating into the enhanced work set attributes 216.

In one example, an enhanced work set attribute 216 can be populated with a just-in-time process such as in response to a trigger 222. For instance, if an employee checks a payroll status of the account, the check on payroll status provides a trigger, such as trigger 222 for account provisioning manager 202 to populate the enhanced work set attribute 216 related to payroll status, while propagation of data into other enhanced attributes work set attributes 216 are temporarily paused or otherwise allowed to proceed in the normal processes. Via the use of a trigger, the enhanced work set attribute 216 can be reassigned a priority in population of the enhanced work set attributes 216.

Figure 3:
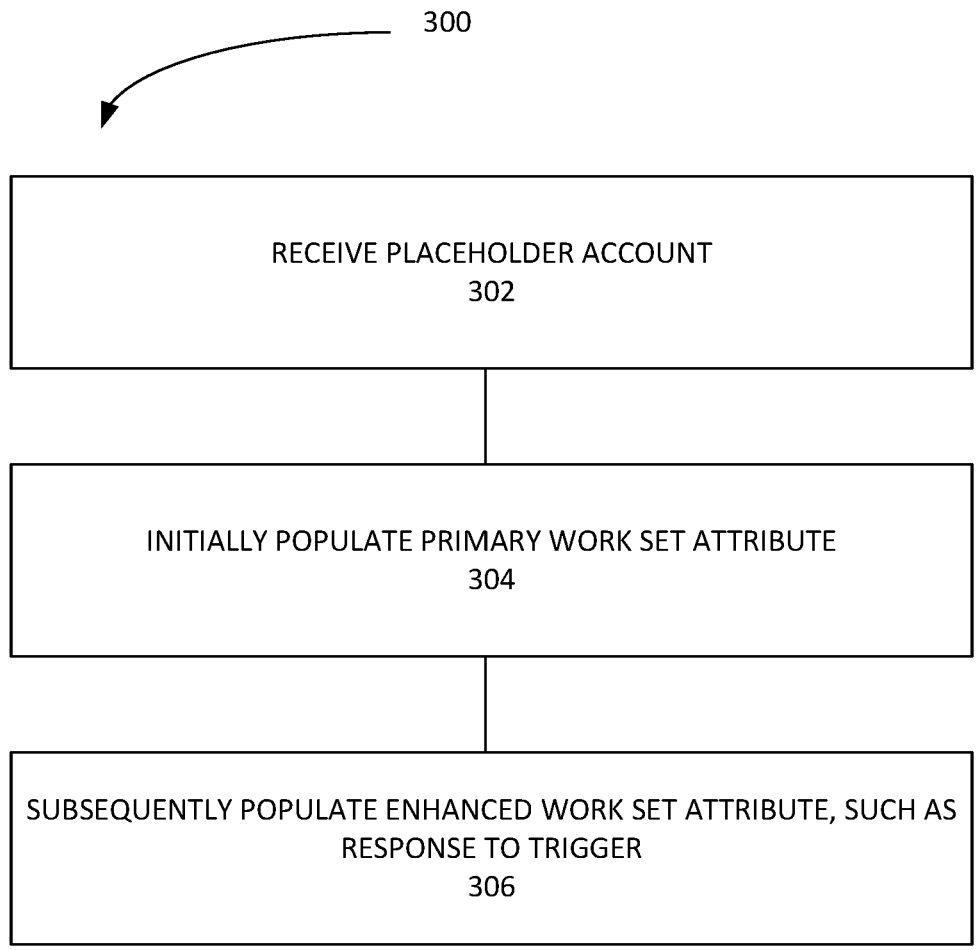
FIG. 3 is a schematic diagram illustrating an example method of the account provisioning manager of FIG. 2.

FIG. 3 illustrates an example method 300 that can be implemented with the account provisioning manager 202. For example, the method 300 can be performed or assisted with the account provisioning manager 202 with access to the plurality of placeholder accounts 208 in the placeholder account repository 206 and to other systems 220. Further, the account provisioning manager 202 can be responsive to triggers 222 to reassign priority in populating attributes 212. Triggers 222 can include multiple or sequential triggers to the same account. In one example, the method 300 is implemented as system having a processor and a memory device such as processor 102 and memory 104 on computing device 100. The memory device, such as memory 104 can be applied to store computer executable instructions for causing the processor 102 to perform the method 300, such as a program for provisioning accounts.

A placeholder account is received with a primary work set attribute and a plurality of enhanced work set attributes at 302. Initially, the primary work set attribute is populated with data to convert the placeholder account into an onboarded operating account at 304. Subsequently, the plurality of enhanced work set attributes are populated via data propagation into the onboarded operating account, wherein an enhanced work set attribute of the plurality of enhanced work set attributes is selectively populated in response to a trigger on onboarded operating account at 306.

The placeholder account is received with a primary work set attribute and a plurality of enhanced work set attributes at 302. The placeholder account can be selected from a plurality of placeholder accounts, which can be sorted into sets of placeholder accounts for different classes of users, such as different classes of employees. Classes can be distinguished by a number of categorizations including job function, job roles, departments within the enterprise, whether the employee is a temporary employee, permanent employee, or contractor. The placeholder account of includes a set of primary work set attribute and enhanced work set attributes appropriate for the class of user, or employee. In one example, the placeholder accounts can be programmatically altered at the enterprise to allow the organization to particularly define the classes as well as what attributes are designated as primary work set attributes or enhanced work set attributes. The plurality of placeholder accounts are templatized user accounts that are ready to be populated with particular or specific data into the attributes as the data becomes available during the typical multi-step onboarding process so that the overall perceived latency in completely onboarding a user account is masked. During population of the attributes, the placeholder account will proceed from the place placeholder account to a provisional operating and onboarded account, which can be used as an operating account in an identity service, to a complete onboarded account, which can be used as an operating account in the identity service and includes full status of the user. In some examples, the provisional account can be further validated by a service prior to becoming an operating and onboarded account.

The primary work set attribute is populated with data to convert the placeholder account into an onboarded operating account, or a provisional onboarded operating account at 304. Primary work set attributes are highest ranked attributes in population priority that enable an appropriate number of services to allow the user to perform a base functionality in the organization associated with their class, or the appropriate number of services to permit an employee or guest to begin employment, such as minimal access. Primary work set attributes, in one example, can be filled automatically with data gathering mechanisms. The primary work set attributes of the placeholder account are initially populated with data to convert the placeholder account into a provisional onboarded and operating account. In an example of initially populated, some primary work set attributes are pre-populated in the placeholder account repository. In another example, account provisioning manager receives the placeholder account from the repository, and populates the primary work set attribute. The provisional onboarded and operating account is a less than completely provisioned account, but a working account in which the provisioning continues to lower ranked attributes such as the enhanced work set attributes. This placeholder account, after transitioned into an onboarded operating account, can be granted additional access, permissions, roles over time via iterative addition of new data.

The plurality of enhanced work set attributes are populated via data propagation into the onboarded operating account at 306. Enhanced work set attributes are those ranked lower in priority than the primary work set attributes but are used, for example, to provide complete provisioned account, such as an employment status. Propagation of the enhanced work set attributes in one example, can continue via the data gathering processes after the account has been onboarded, such as onboarded into an identity service, and is a provisionally onboarded and operating account with the identity service. After the primary work set attributes are populated, the plurality of enhanced work set attributes are populated via data propagation into the onboarded operating account. The enhanced work set attributes can be ranked with a relative priority for population with respect to themselves. Data for the primary work set attributes can be accessed from other systems, which may be signals external from the enterprise. For example, other systems can include social security, clearance services, tax data repositories, credit bureaus, and decentralized data sources. In one example, once the enhanced work set attributes are populated, the provisional onboarded and operating account becomes a complete onboarded and operating account. In some examples, the fully populated provisional account can be further validated by a service prior to becoming a complete operating and onboarded account.

An enhanced work set attribute of the plurality of enhanced work set attributes is selectively populated in response to a trigger on onboarded operating account at 306. In one example, an enhanced work set attribute can be populated with a just-in-time process such as in response to a trigger. For instance, if an employee checks a payroll status of the account, the check on payroll status provides a trigger, such as trigger for account provisioning manager to populate the enhanced work set attribute related to payroll status, while propagation of data into other enhanced attributes work set attributes are temporarily paused or otherwise allowed to proceed in the normal processes. Via the use of a trigger, the enhanced work set attribute can be reassigned a priority in population of the enhanced work set attributes.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method, comprising:
   storing a plurality of placeholder accounts associated with an identity service, the plurality of placeholder accounts including at least a first set of placeholder accounts corresponding to a first user class associated with a first user attribute and a second set of placeholder accounts corresponding to a second user class associated with a second user attribute;
   based at least on an indication that a user account is to be onboarded in the identity service for a user and further based at least on the user being included in the first user class as a result of the user having the first user attribute, selecting a placeholder account for the user from the first set of placeholder accounts; and
   reducing latency of onboarding the user account, which is based on the placeholder account, in a network into the identity service by performing the following operations:
   converting the placeholder account into a provisional onboarded operating account by initially populating a primary work set attribute that is included in the placeholder account with data, which enables the provisional onboarded operating account to be used as an operating account in the identity service; and
   after initially populating the primary work set attribute with the data, completing the onboarding of the user account by populating a plurality of enhanced work set attributes that are included in the placeholder account via data propagation into the provisional onboarded operating account to provide a complete onboarded operating account, wherein completing the onboarding of the user account comprises:
   triggering population of an enhanced work set attribute of the plurality of enhanced work set attributes based on an operation being performed with regard to the provisional onboarded operating account and further based on the enhanced work set attribute being associated with the first user class.

2. The method of claim 1, wherein the primary work set attributes are ranked with higher priority for population than the enhanced work set attributes.

3. The method of claim 1, wherein the trigger includes user access of the enhanced work set attribute.

4. The method of claim 1, wherein the trigger reassigns priority for population of the enhanced work set attribute.

5. The method of claim 1, wherein populating the plurality of enhanced work set attributes includes accessing data from data storage outside of an enterprise.

6. The method of claim 1, wherein the data to convert the placeholder account into an onboarded operating account includes employment data.

7. A computer readable storage device, which is not a propagating signal, to store computer executable instructions to control a processor to:
   store a plurality of placeholder accounts associated with an identity
   service, the plurality of placeholder accounts including at least a first set of placeholder accounts corresponding to a first user class associated with a first user attribute and a second set of placeholder accounts corresponding to a second user class associated with a second user attribute;
   based at least on an indication that a user account is to be onboarded in the identity service for a user and further based at least on the user being included in the first user class as a result of the user having the first user attribute, select a placeholder account for the user from the first set of placeholder accounts; and
   reduce latency of onboarding the user account, which is based on the placeholder account, in a network into the identity service by performing the following operations:
   convert the placeholder account into a provisional onboarded operating account by initially populating a primary work set attribute that is included in the placeholder account with data, which enables the provisional onboarded operating account to be used as an operating account in the identity service; and
   after the primary work set attribute is initially populated with the data, complete the onboarding of the user account by populating a plurality of enhanced work set attributes that are included in the placeholder account via data propagation into the provisional onboarded operating account to provide a complete onboarded operating account, wherein complete the onboarding of the user account comprises:
   trigger population of an enhanced work set attribute of the plurality of enhanced work set attributes based on an operation being performed with regard to the provisional onboarded operating account and further based on the enhanced work set attribute being associated with the first user class.

8. The computer readable storage device of claim 7, wherein the trigger reassigns priority for population of the enhanced work set attribute.

9. The computer readable storage device of claim 7, wherein the plurality of enhanced work set attributes are ranked in priority with respect to themselves.

10. A system, comprising:
   a memory device to store a set of instructions and to further store a plurality of placeholder accounts associated with an identity service, the pluraliy of placeholder accounts including at least a first set of placeholder accounts corresponding to a first user class associated with a first user attribute and a second set of placeholder accounts corresponding to a second user class associated with a second user attribute; and
   a processor to execute the set of instructions to:
   based at least on an indication that a user account is to be onboarded in the identity service for a user and further based at least on the user being included in the first user class as a result of the user having the first user attribute, select a placeholder account for the user from the first set of placeholder accounts; and
   reduce latency of onboarding the user account, which is based on the placeholder account, into the identity service by performing the following operations:
   convert the placeholder account into a provisional onboarded operating account by initially populating a primary work set attribute that is included in the placeholder account with data, which enables the provisional onboarded operating account to be used as an operating account in the identity service; and
   after the primary work set attribute is initially populated with the data, complete the onboarding of the user account by populating a plurality of enhanced work set attributes that are included in the placeholder account via data propagation into the provisional onboarded operating account to provide a complete onboarded operating account, wherein complete the onboarding of the user account comprises:
   trigger population of an enhanced work set attribute of the plurality of enhanced work set attributes based on an operation being performed with regard to the provisional onboarded operating account and further based on the enhanced work set attribute being associated with the first user class.

11. The system of claim 10, wherein the enhanced work set attributes are populated with data received from sources outside of an enterprise.

12. The system of claim 10, wherein the identity service is included in a cloud service.

13. The method of claim 1, wherein the complete onboarded operating account includes full status of a user associated with the user account.

14. The method of claim 1, wherein triggering the population of the enhanced work set attribute comprises: triggering the population of the enhanced work set attribute while another enhanced work set attribute of the plurality of enhanced work set attributes is temporarily paused.

15. The method of claim 1, further comprising: gating performance of a second operation with regard to the user account until a second enhanced work set attribute of the plurality of enhanced work set attributes is populated.

16. The method of claim 1, wherein the first user class is a temporary employee class, and the first user attribute indicates employment as a temporary employee; and
   wherein the second user class is a permanent employee class, and the second user attribute indicates employment as a permanent employee.

17. The method of claim 1, wherein the first user class is a permanent employee class, and the first user attribute indicates employment as a permanent employee; and
   wherein the second user class is a temporary employee class, and the second user attribute indicates employment as a temporary employee.

18. The system of claim 10, wherein the first user class is a temporary employee class, and the first user attribute indicates employment as a temporary employee; and
   wherein the second user class is a permanent employee class, and the second user attribute indicates employment as a permanent employee.

19. The system of claim 10, wherein the first user class is a permanent employee class, and the first user attribute indicates employment as a permanent employee; and wherein the second user class is a temporary employee class, and the second user attribute indicates employment as a temporary employee.

20. The system of claim 10, wherein the first user class is a first department class, and the first user attribute indicates employment in a first department of an enterprise; and wherein the second user class is a second department class, and the second user attribute indicates employment in a second department of the enterprise that is different from the first department.

\* \* \* \* \*